April 14, 1970     M. A. TRISTINE     3,506,150

ORNAMENTAL BAND FOR GLASSWARE AND THE LIKE

Filed Feb. 19, 1968     2 Sheets-Sheet 1

INVENTOR.
Martin A. Tristine
BY
AGENT

April 14, 1970   M. A. TRISTINE   3,506,150
ORNAMENTAL BAND FOR GLASSWARE AND THE LIKE
Filed Feb. 19, 1968   2 Sheets-Sheet 2
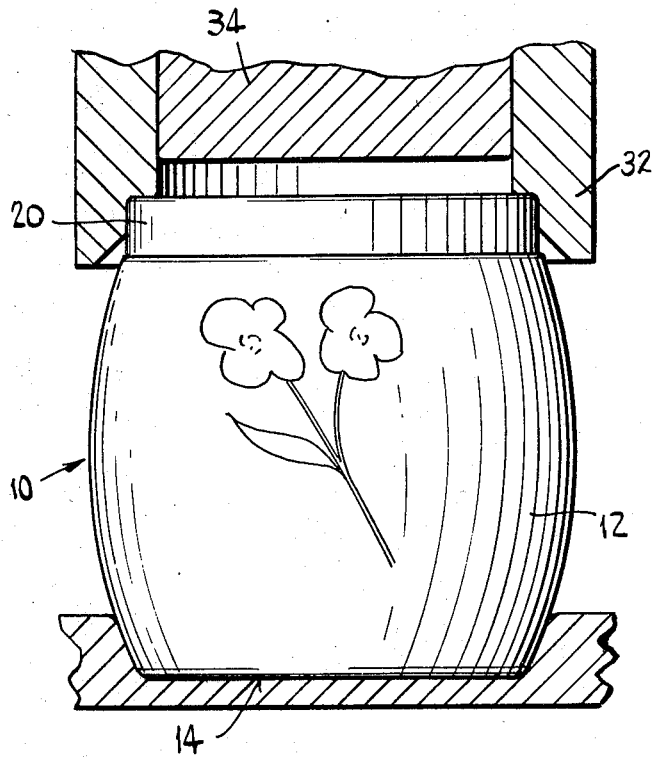
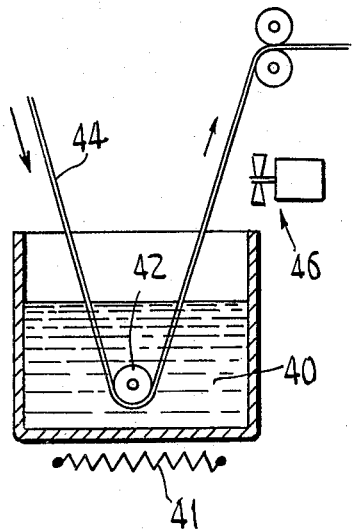
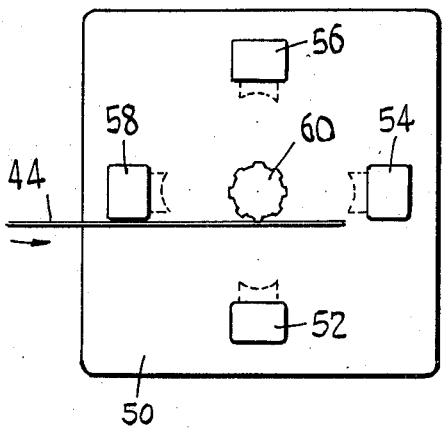
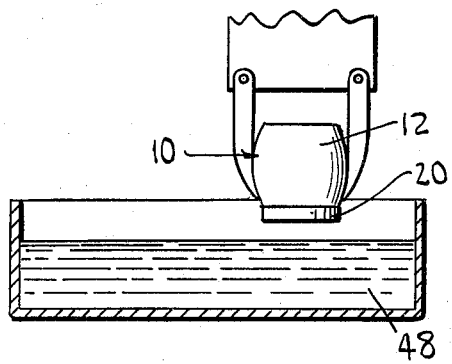
INVENTOR.
Martin A. Tristine
BY
AGENT

United States Patent Office 3,506,150
Patented Apr. 14, 1970

3,506,150
ORNAMENTAL BAND FOR GLASSWARE
AND THE LIKE
Martin A. Tristine, Stratford, Conn., assignor to Clark Metal Products, Inc., Fairfield, Conn., a corporation of Connecticut
Filed Feb. 19, 1968, Ser. No. 706,313
Int. Cl. B65d 23/08; B44c 1/18
U.S. Cl. 215—12                                11 Claims

ABSTRACT OF THE DISCLOSURE

An ornamental rim band applied to the edge or lip portion of hollow glassware. The band is preferably of metal, although certain classes of plastics would be suitable. Considerable clearance exists between the band and the enclosed glass rim, due to the large tolerances needed in the manufacture of glassware. In the clearance space a sinuous expansion ring coated with a heat-activated or a solvent-activated adhesive substance is disposed and compressed, pressing outward against the band and inward against the glass rim. Applied heat or solvent, as by use of a punch or bath surrounding the band, activates the adhesive which then cements the band to the glass.

BACKGROUND

This invention relates to the applying of ornamental and/or protective bands, particularly of metal, to the rim portions of hollow glassware and like articles. Heretofore such bands were not commercially feasible using mass production techniques. They involved instead a custom fabrication, and were either individually custom fitted and cemented, or else loosely fitted and held with excessive amounts of cement applied as the looseness and tolerances dictated. No close fits were possible between the bands and the carrier portions of the glassware because of the dimensional variations of the latter. The use of bands of this type thus was strictly limited, generally to custom-made articles, due to the high costs, uncertain quality of work, and large amount of time needed.

SUMMARY

The above problems, disadvantages and drawbacks of using metal bands on glassware and the like are obviated by the present invention, and one object of the invention is to provide a novel and improved method of and structure for attaching bands, preferably of metal, to glassware and the like, which without changing glass tolerance figures enables high-volume or mass production techniques to be utilized as distinguished from individual fitting and custom manufacture, thereby considerably reducing costs while increasing production. This is accomplished by the provision of an adhesive-coated sinuous and readily compressible intermediary retainer band or strip which is interposed between the outer or ornamental band and the rim or enclosed portion of the glassware article, in the appreciable clearance space existing therebetween. The intermediary band constitutes in effect a fastening device of variable effective thickness. Preferably it is discontinuous, as when formed from a straight strip of predetermined length. The formed strip has a heat-activated or solvent-activated adhesive coating, and when assembled with the outer band onto the glassware rim it becomes radially compressed, applying force radially outward against the ornamental band and radially inward against the glassware surface. By the application of heat or solvent to the assemblage, as with the use of a heated punch or applicator tool, or else a solvent bath, the adhesive temporarily softens and subsequently forms a bond with the glass surfaces and the inside of the ornamental band.

Other objects and features of the invention reside in an improved ornamental band structure and attachment method as above, which are especially simple, inexpensive, adaptable to mass production equipment, and effective and reliable when practiced and in service.

Still other features and advantages will hereinafter appear.

In the drawings:

FIG. 6 is a side elevational view of the assembled container and band, showing one kind of production assembly tool by which the band may be secured to the container against removal.

FIG. 7 is a diagrammatic representation of a coating apparatus and procedure by which the intermediary or retainer ring is coated with adhesive.

FIG. 8 is a diagrammatic representation of a four-slide machine and procedure for forming the coated strip into the discontinuous compressible retainer rings.

FIG. 9 is a diagrammatic representation of an apparatus by which the ornamented container is dipped in a solvent bath, to activate the coating of the retainer ring.

Figure 1:
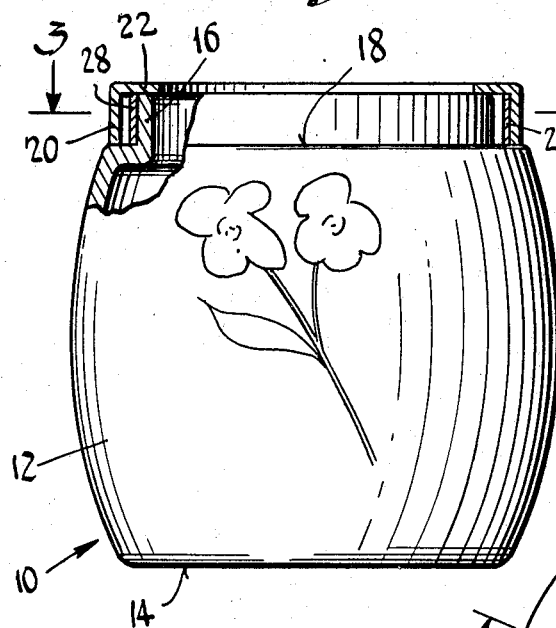
FIG. 1 is a view partly in side elevation and partly in vertical axial section, showing the improved ornamental ring or band applied to a glass or similar container.

As shown, a container or article of glassware suitable for practice of the invention is designated generally by the numeral 10, said container having for example a rounded body portion 12, a generally flat bottom wall 14, and a top rim portion 16 separated from the body portion 12 by an annular external shoulder 18.

As is well understood in the manufacture of glassware articles, the diametric and circumferential tolerances of the circular rim 16 are quite appreciable as compared with tolerances which can be expected in cast or drawn metal or plastic parts. As a rule, the glassware tolerances are so substantial that efforts heretofore which were directed toward fitting and securing ornamental metal bands or rings to the rim required custom fitting operations, individual attention, etc. whereby the use of such ornamental bands could not be readily carried out by production equipment, in satisfactory commercial quantities.

In accordance with the present invention there is provided an ornamental band or ring 20 having an inside diameter which results in very appreciable clearance space with respect to the rim 16 of the container 10, such ornamental band being attached to the rim in a manner which does not require custom fitting, custom cementing of individual assemblages or the like. Instead, the band 20, in accordance with the invention, may be secured in place readily by mass production techniques.

Figure 2:
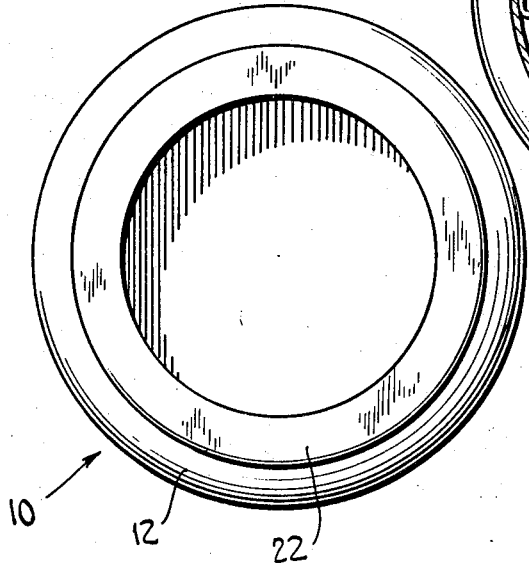
FIG. 2 is a top plan view of the container and band assemblage of FIG. 1.

As seen in FIGS. 1 and 2, the ornamental band 20 may have a top, inwardly extending circular flat flange 22 adapted at its inner periphery to overlie the top edge of the rim 16 of the container 12.

By the present invention there is provided a novel attachment means and method, comprising a sinuous band or strip 24, preferably constituted of metal such as aluminum, steel, brass or the like, or else of a suitable plastic, the strip 24 having outwardly offset portions 26 and inwardly offset portions 28 and preferably being discontinuous and generally in the shape of a circle, with adjoining ends 30. Thus, the strip 24 may be readily formed by a mass production metal rolling or stamping technique well understood in the metal working arts. Or, the strip 24 may be formed by a flat punching operation followed by a rolling operation to impart the necessary curl or curvature, and cut off tools may be used to obtain the desired strip size and length. Various production techniques are presently available to form the compression ring 24, depending on the facilities of the manufacturer.

Figure 5:
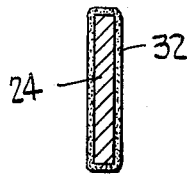
FIG. 5 is a fragmentary section of the retainer ring, taken on the line 5—5 of FIG. 4.

Further, in accordance with the invention and as illustrated in FIG. 5, the compression ring or strip 24 is provided with a heat-activated or solvent-activated coating of adhesive 32, which may be applied after the forming of the strip but is preferably applied prior to the forming inasmuch as the application can then be carried out by a continuous dip process. After the dip coating of a long and continuous strip of suitable metal stock, the coating may be dried and the compression ring 24 formed therefrom without appreciable deterioration of the coating.

Figure 3:
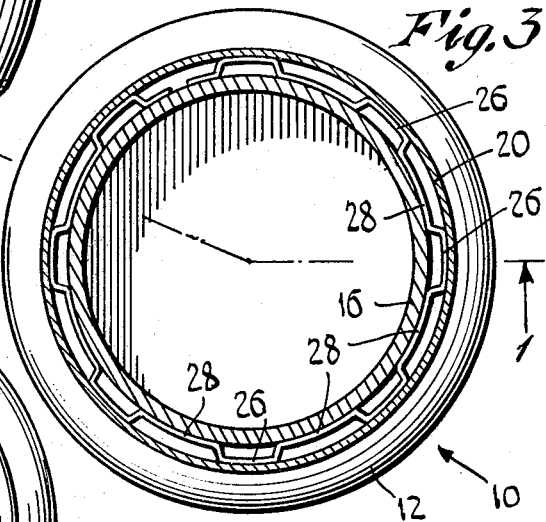
FIG. 3 is a horizontal section looking downward, taken on the line 3—3 of FIG. 1. The sectional portion of FIG. 1 is taken on the line 1—1 of FIG. 3.

As seen in FIGS. 1 and 3, the intermediary compression or retainer ring 24 is interposed between the ornamental band 20 and the annular rim 16 of the container. This may be effected in any convenient way. For example, the ring 24 may be initially nested in the ornamental band 20 and the assemblage thereafter applied to the rim 16 of the container. Due to the rounded nature of the top edge of the rim 16 there may be effected a slight expansion of the ring 24 as the assemblage is applied or moved into place. Relatively little compression of the ring 24 is normally involved, whereby the forces required to assemble or to place the assembled rings onto the container is relatively small. This may be readily done by hand or else by automatic machinery, in either case involving only a small amount of time. Or, the assembly of rings 20, 24 may be picked up by a punch 32 and thereafter applied to the container 10, as illustrated in FIG. 6. The punch 32 is preferably heated, and the heat thereof is transmitted to the ornamental ring 20 as well as to the compression ring 24. As this occurs, the thermosensitive adhesive with which the ring 24 is coated, is softened or melted, and after the removal of the punch 32 the subsequent cooling will result in the adhesive becoming bonded to the glass rim 16 as well as to the inside surface of the ornamental band 20.

The heated punch 32 may have a central stripper portion 34 that is advanceable downward, to dislodge the ornamental band 20 from the grip of the punch at the time that the latter is to be removed, as will be understood.

Instead of heating the punch 32, the glassware may be hot, as when being conveyed immediately after forming. If a solvent-activated adhesive is used on the band 24, the assemblage may be inverted and partially immersed in a solvent bath 48, as shown in FIG. 9, to effect the adhesion. In consequence of any of the foregoing procedures, the band 20 will become firmly adhered to the container, resisting all ordinary handling or efforts which might tend to remove the band.

Figure 4:
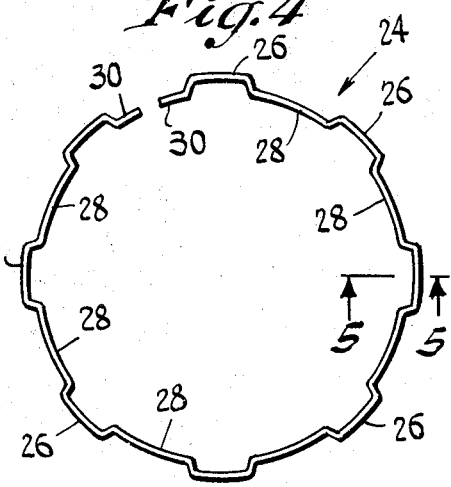
FIG. 4 is a top plan view of the intermediary compressible retainer ring or strip used to secure the outer ornamental band to the rim portion of the container.

An apparatus and procedure for coating strip stock from which the retainer rings are made is illustrated in FIG. 7. Here a bath 40 of thermo-activated or solvent-activated adhesive substance contains a roller 42 around which the continuous strip stock 44 is passed. After leaving the bath 40, the strip stock is cooled or dried by a suitable procedure which may include electric fans indicated by the numeral 46 to solidify the adhesive coating. The strip is thereafter fed into a four-slide machine 50 which has punch and die tools 52, 54, 56, 58 and 60 that operate on the strip 44 to corrugate it, bend it and cut it off in one sequence of operations so as to produce the rings 24 shown in FIG. 4.

From the foregoing it will be seen that I have provided a novel and improved ornamental band structure and method of applying the same to a glassware article or the like, which readily lends itself to mass production equipment and techniques, and which overcomes the problems caused by the normally large tolerances required of glass articles. The ornamental band 20 may be either of metal or of a suitable plastic substance not susceptible to heat or solvents, and the same is true of the compression band 24. While the use of metal for both of the bands has been found to be especially suitable, the invention has utility if the bands are made of other materials, including fiberglass, thermo-setting plastics, ceramic material (for the ornamental band) etc. It is necessary however that the compression band or strip 24 have a certain degree of flexibility or yieldability, and thus it could not readily be made of well known ceramic substances.

Other variations and modifications are also possible, and portions of the improvement may be used without others.

I claim:

1. The method of attaching an ornamental band around an article of glassware or the like, which includes the steps of assembling a sinuous and flexible retainer ring which is coated with a normally inactive, activatible adhesive between the band and the article so as to press against both, and activating the adhesive on the retainer ring whereby the latter adheres the band to said article.

2. The method of claim 1, and including the applying of heat to the adhesive to activate the same.

3. The method of claim 1, and including the applying of a solvent to the adhesive to activate the same.

4. The method of claim 1, and including the further step of encircling the ornamental band with a heated punch to effect said activation of the adhesive.

5. The method of claim 1, and including the steps of passing continuous strip stock through a coating bath to apply a normally inactive, activatible adhesive coating thereon, and forming the coated strip stock into discontinuous retainer rings having a sinuous and generally circular configuration, assembling one such ring between an ornamental band and the glassware article so as to press against both, and activating the adhesive on the retainer ring whereby the latter adheres the band to said article.

6. The method of claim 1, and including the steps of passing continuous strip stock through a coating bath to apply a normally inactive, activatible adhesive coating thereon, and stamping the coated strip stock to form it into retainer rings having a sinuous and generally circular configuration, assembling one such ring between an ornamental band and the glassware article so as to press against both, and activating the adhesive on the retainer ring whereby the latter adheres the band to said article.

7. A new article of manufacture comprising, in combination:
  (a) a hollow body of glassware or the like, having an annular rim,
  (b) an ornamental band extending around the outside of said rim, wherein the improvement comprises:
  (c) said band and rim having appreciable radial clearance space therebetween, and
  (d) a sinuous, flexible retainer ring disposed in the space between the band and rim, said retainer ring pressing outward against the band and inward against the rim and being coated with a normally-inactive, activatible adhesive by which the ring is adhered to the band and rim, thereby to secure the band and rim to each other.

8. The invention as defined in claim 7, wherein:
  (a) the retainer ring is discontinuous and has its ends closely juxtaposed.

9. The invention as defined in claim 7, wherein:
  (a) the retainer ring has spaced-apart arcuate portions in intimate contact with the ornamental band, and has other spaced-apart arcuate portions in intimate contact with the rim.

10. The invention as defined in claim 7, wherein:
(a) the adhesive is solvent activated.
11. The invention as defined in claim 7, wherein:
(a) the adhesive is heat activated.

References Cited

UNITED STATES PATENTS

| | | | |
|---|---|---|---|
| 890,284 | 6/1908 | Kintz | 215—12 |
| 2,661,889 | 12/1953 | Phinney | 215—13 X |
| 2,739,829 | 3/1956 | Pedlow et al. | 156—294 X |

DONALD F. NORTON, Primary Examiner

U.S. Cl. X.R.

156—69, 294